April 18, 1939.　　　　F. HANEL　　　　2,155,130
ANTISKIDDING DEVICE FOR MOTOR VEHICLES
Filed July 7, 1937
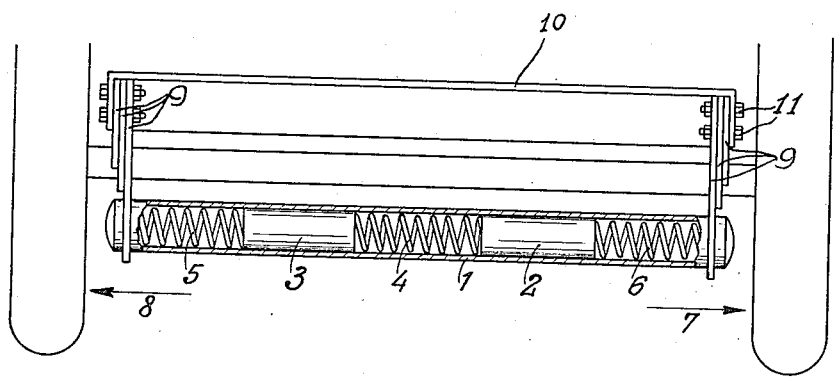
Inventor:
F. Hanel
By: Glascock Downing & Seebold
Attys.

Patented Apr. 18, 1939

2,155,130

UNITED STATES PATENT OFFICE 2,155,130

ANTISKIDDING DEVICE FOR MOTOR VEHICLES

Franz Hanel, Berlin-Charlottenburg, Germany

Application July 7, 1937, Serial No. 152,409
In Germany August 6, 1936

3 Claims. (Cl. 280—150)

The present invention relates to an anti-skidding device for motor vehicles.

Through my U. S. Patent No. 1,954,409 an antiskidding device for motor vehicles is protected, which has a V-shaped carrier, fixed at the rear part of the underframe, parallel to the rear axle, and a weight, which is suspended from this carrier and which under the influence of the inertia effect will be displaced in the one or the other direction along the carrier, from the uppermost point of the same. The weight may simultaneously be supported by springs, which strive to hold it in its normal position at the middle of the V-shaped carrier, so that the displacement of the weight which takes place under the influence of the inertia effect, for instance when the vehicle runs through a curve, is resisted by the effect of gravity exerted upon the weight and by the springs.

The present invention represents an essential improvement and perfection of the device disclosed in my U. S. Patent No. 1,954,409, in that it is much more sensitive and will counteract a skidding movement immediately at the moment this is initiated.

Another advantage of the novel device according to the present invention is that the construction is very simple. In addition hereto the new anti-skidding device is so designed that it may be arranged in the most advantageous place, for instance directly behind the rear axle or still farther behind, on the underframe of the vehicle, whereby the momentum which counteracts the skidding movement is increased. This again involves the advantage that the weight of the anti-skidding bodies, if desired, may be reduced correspondingly. The anti-skidding device according to the invention can also be used on vehicles with low-lying underframes.

According to the present invention two weights are arranged symmetrically to the vertical longitudinal central plane of the vehicle, in a straight tube, which is arranged transversely to the longitudinal axis of the vehicle, preferably as far as possible behind the rear axle. The weights are elastically held in their normal position by yielding means, arranged between the weights and between the weights and the ends of the tube, and when the vehicle starts to skid, the weights will be displaced in one direction or the other, thereby overcoming the resistance offered by the yielding means.

The experiments have shown that the weight of this anti-skidding device can be reduced considerably below that of the device consisting of a V-shaped running rail, from the centre of which an anti-skidding body is suspended, without reducing the anti-skidding effect.

Also structurally the present invention must be regarded as an essential improvement, because a vehicle with a low or deep-lying underframe is connected with risks in suspending a voluminous body from a V-shaped rail, since it may happen that the weight will strike against the road when the vehicle runs on a road having a rough surface and the frame of the vehicle bends.

The arrangement of the anti-skidding bodies in a horizontal, closed tube renders it possible also to mount the device on small vehicles with a low chassis and effectively excludes dust and other foreign matter from the weights which reduce the sensitiveness of the same, and which would greatly reduce the effectiveness of the device.

An embodiment of my invention is illustrated by way of example in the accompanying drawing. The figure shown in the drawing is a partial rear view in elevation of a vehicle and shows in section an anti-skidding device attached to the rear axle of the vehicle.

The anti-skidding device comprises a horizontal tube 1, in which two suitable cylindrical bodies 2 and 3 and of a suitable weight are arranged symmetrically to the longitudinal medial plane of the vehicle. The cylindrical weights 2 and 3 are yieldingly urged away from each other by a helical spring 4 and are in a similar way urged away from the ends of the tube 1 by helical springs 5 and 6.

Instead of helical springs also other elastic means may be used, such as for instance rubber buffers, hydraulic or pneumatic pistons or the like.

If for instance a centrifugal force acts in the direction of the arrows 7 the bodies 2 and 3 will, due to their inertia, move in the direction of the arrow 8, so that the springs 4 and 5 are compressed and the spring 6 expanded. Hereby a reactive force, which is directed exactly opposite to the centrifugal force, will act upon the tube 1. This reaction must be taken up by the bearing members 9 of the tube 1, which are fixed to the vehicle, for instance to the rear axle, or by the underframe of the vehicle.

The bearing members 9 for the tube 1 may for instance consist of leaf springs, which are fixed to the transverse member 10 of the underframe by means of bolt and nut arrangements 11. Through this resilient suspension of the tube 1 of the anti-skidding device, the shocks are dampened which may be caused through the displacement of the bodies 2 and 3. The farther away the tubular anti-skidding device is arranged behind the centre of gravity of the mass, upon which the centrifugal force acts which is generated through a skidding movement, the longer the lever arm or springs 9 will be, upon which the reaction force acts, which is generated by the bodies 2 and 3, and the higher also the torque will be which counteracts the effect of the skidding movement. It is therefore particularly advantageous to arrange the tubular anti-skidding device as far as possible behind the rear axle of the underframe, so that it simultaneously may serve as the rear buffer rod, which is the rearmost part of the underframe.

I claim:—

1. An anti-skidding device for motor vehicles, comprising a straight tube, horizontally arranged behind the rear axle of the vehicle, and transversely to the longitudinal axis of the vehicle, two weights displaceably located within the said tube and arranged symmetrically to the medial vertical plane of the vehicle, and elastic means yieldingly urging the said weights away from each other and from the ends of the tube.

2. An anti-skidding device for motor vehicles, comprising a straight tube, means for supporting said tube horizontally and behind the rear axle of the vehicle, transversely to the longitudinal axis of the vehicle so that it will serve as a buffer rod for the vehicle, two weights displaceably located within the said tube and arranged symmetrically to the medial vertical plane of the vehicle, and elastic means yieldingly urging the said weights away from each other and from the ends of the tube.

3. An anti-skidding device for motor vehicles, comprising a straight tube, means for supporting said tube horizontally and behind the rear axle of the vehicle, and transversely to the longitudinal axis of the vehicle so that the tube will serve as a buffer rod for the vehicle, two weights displaceably located within the said tube and arranged symmetrically to the medial vertical plane of the vehicle, and elastic means yieldingly urging the said weights away from each other and from the ends of the said tube, and said supporting means being in the form of leaf springs attached to the underframe of the vehicle and the respective ends of the tube and displaceable transversely for coacting with the elastic means, in addition to supporting the tube.

FRANZ HANEL.